United States Patent [19]

Liles

[11] Patent Number: 5,026,768
[45] Date of Patent: Jun. 25, 1991

[54] METHOD OF PRODUCING SILICONE EMULSION

[75] Inventor: Donald T. Liles, Midland, Mich.

[73] Assignee: Dow Corning Corporation, Midland, Mich.

[21] Appl. No.: 563,227

[22] Filed: Aug. 6, 1990

Related U.S. Application Data

[62] Division of Ser. No. 130,764, Dec. 9, 1987, Pat. No. 4,978,710.

[51] Int. Cl.$^5$ .............................................. C08L 83/05
[52] U.S. Cl. ..................... 524/837; 524/861; 524/862; 528/15; 528/23; 528/31
[58] Field of Search ............... 524/837, 860, 861, 862; 528/15, 23, 31

[56] References Cited

U.S. PATENT DOCUMENTS

| | | | |
|---|---|---|---|
| 2,891,920 | 6/1959 | Hyde et al. | 260/29.2 |
| 3,061,567 | 10/1962 | Keil | 260/29.2 |
| 3,294,725 | 12/1966 | Findlay et al. | 260/29.2 |
| 3,419,593 | 12/1968 | Willing | 260/448.2 |
| 3,445,420 | 5/1969 | Kookootsedes et al. | 260/37 |
| 3,867,343 | 2/1975 | Garden | 260/46.5 UA |
| 3,923,705 | 12/1975 | Smith | 260/255 |
| 3,989,667 | 11/1976 | Lee et al. | 260/46.5 UA |
| 4,190,688 | 2/1980 | Traver et al. | 427/391 |
| 4,248,751 | 2/1981 | Willing | 260/29.2 M |
| 4,310,678 | 1/1982 | Blizzard et al. | 556/451 |
| 4,568,718 | 2/1986 | Huebner et al. | 524/837 |
| 4,585,848 | 4/1986 | Evans et al. | 528/15 |
| 4,618,645 | 10/1986 | Bauman et al. | 524/745 |

*Primary Examiner*—John C. Bleutge
*Assistant Examiner*—R. Dean, Jr.
*Attorney, Agent, or Firm*—Edward C. Elliott

[57] ABSTRACT

A method of obtaining an aqueous silicone emulsion which dries to an elastomer comprises mixing (1) hydroxyl endblocked polydiorganosiloxane free of aliphatic unsaturation, (2) silicon hydride crosslinker, (3) platinum compound catalyst compatible with the polydiorganosiloxane, (4) catalyst inhibitor, (5) anionic or nonionic surfactant, and (6) water and polymerizing the polydiorganosiloxane. These ingredients can be combined in emulsion form following three differing versions of a method of combining the ingredients and polymerizing the polydiorganosiloxane. In each case, the emulsion, which may also contain filler, is useful as a coating or sealant.

7 Claims, No Drawings

METHOD OF PRODUCING SILICONE EMULSION

"This is a divisional of copending application Ser. No. 07/130,764 filed on Dec. 9, 1987", now U.S. Pat. No. 4,978,710.

BACKGROUND OF THE INVENTION

1. Field of the Invention

This invention relates to method of making silicone emulsions which yield an elastomer upon removal of the water at ambient conditions.

2. Background Information

Silicone paper release coatings are taught in U.S. Pat. No. 4,190,688, issued Feb. 26, 1980. The emulsion comprises a vinyl-containing polydiorganosiloxane having hydroxyl endblocking, a hydride cross-linking agent, water, and an emulsifying agent. The composition can be cured either with a tin salt of a carboxylic acid or it can be cured with a platinum complex catalyst.

A latex of crosslinked silicone is prepared in U.S. Pat. No. 4,248,751, issued Feb. 3, 1981, by emulsifying a vinyl endblocked polydiorganosiloxane and an organosilicon compound having silicon-bonded hydrogen atoms with water and a surfactant, adding platinum catalyst, and then heating the emulsion. Colloidal silica can be added to the emulsion to provide a tougher product.

SUMMARY OF THE INVENTION

Elastomeric films and coatings can be produced by drying emulsions which are the product obtained by reacting hydroxyl endblocked polydiorganosiloxane free of unsaturation, silicon hydride crosslinker, and a platinum compound compatible with the polydiorganosiloxane, in the presence of surfactant, and water.

DESCRIPTION OF THE INVENTION

This invention relates to a method of producing an aqueous silicone emulsion which dries to an elastomer comprising (A) homogenizing a mixture of (1) 100 parts by weight of hydroxyl endblocked polydiorganosiloxane free of aliphatic unsaturation, (2) from 0.1 to 10 parts by weight of silicon hydride crosslinker, (3) sufficient platinum compound catalyst, compatible with the polydiorganosiloxane, to give from 1 to 200 parts by weight of platinum per million parts of polydiorganosiloxane (1), (4) catalyst inhibitor, (5) anionic or nonionic surfactant, and (6) sufficient water to yield a polydiorganosiloxane content in the mixture of from 40 to 70 percent by weight, (B) emulsion polymerizing the mixture of (A) by addition of anionic polymerization catalyst to give a polymer, then (C) arresting polymerization by raising the pH to 6 to 7.5, whereby an aqueous silicone emulsion is obtained which gives an elastomer upon removal of the water at room temperature.

This invention also relates to a method of producing an aqueous silicone emulsion which dries to an elastomer comprising (A) homogenizing a mixture of (1) 100 parts by weight of hydroxyl endblocked polydiorganosiloxane free of aliphatic unsaturation, (2) from 0.1 to 10 parts by weight of silicon hydride crosslinker, (5) anionic or nonionic surfactant, and (6) sufficient water to yield a polydiorganosiloxane content in the mixture of from 40 to 70 percent by weight, then (B) emulsion polymerizing the mixture of (A) by addition of anionic polymerization catalyst to yield a polymer, then (C) arresting polymerization by raising the pH to 6 to 7.5, to obtain emulsion A, then (D) homogenizing a mixture of (1) from 0 to 100 parts by weight of hydroxyl endblocked polydiorganosiloxane, and (3) platinum compound catalyst, compatible with the polydiorganosiloxane, (5) anionic or nonionic surfactant, and (6) water, then, when (1) is greater than 0, (E) emulsion polymerizing the mixture of (D) by addition of anionic polymerization catalyst, then (F) arresting polymerization by raising the pH to 6 to 7.5, to obtain emulsion B, then (G) mixing emulsion A and sufficient emulsion B to obtain from 1 to 200 parts by weight of platinum per million parts of polydiorganosiloxane (1), whereby an aqueous silicone emulsion is obtained which gives an elastomer upon removal of the water at room temperature.

This invention also relates to a method of producing an aqueous silicone emulsion which dries to an elastomer comprising (A) homogenizing a mixture of (1) 100 parts by weight of hydroxyl endblocked polydiorganosiloxane free of aliphatic unsaturation, and (3) sufficient platinum compound catalyst, compatible with the polydiorganosiloxane, to give from 1 to 200 parts by weight of platinum per million parts of polydiorganosiloxane (1), (5) anionic or nonionic surfactant, and (6) sufficient water to give a polydiorganosiloxane content in the mixture of from 40 to 70 percent by weight, then (B) emulsion polymerizing the mixture of (A) by addition of anionic polymerization catalyst, then (C) arresting polymerization by raising the pH to 6 to 7.5, to obtain emulsion A, then (D) homogenizing a mixture of (2) silicon hydride crosslinker, (5) anionic or nonionic surfactant, and (6) water, to obtain emulsion B, then (E) mixing emulsion A and emulsion B in sufficient quantity to obtain from 0.1 to 10 parts by weight of silicon hydride crosslinker in Emulsion B per 100 parts by weight of hydroxyl endblocked polydiorganosiloxane in Emulsion A, whereby an aqueous silicone emulsion is obtained which gives an elastomer upon removal of the water at room temperature.

The hydroxyl endblocked polydiorganosiloxane (1) can be chosen from any of such well known and available materials, however, the material chosen should have a viscosity such that it can be easily emulsified, a fluid material is preferred such as a material having a viscosity of less than 250 cps at 25° C. The organic groups can be any of those commonly used in polydiorganosiloxanes (excluding groups containing aliphatic unsaturation) such as monovalent substituted and unsubstituted alkyl radicals; with preferred radicals being methyl, ethyl, propyl, and 3,3,3-trifluoropropyl, and monovalent aryl radicals, such as phenyl. A preferred polymer is a hydroxyl endblocked polydimethylsiloxane having a degree of polymerization of about 35 and a viscosity of about 80 cps at 25° C. (0.08 Pa.s).

The silicon hydride crosslinker (2) can be chosen from hydrolyzable silicon hydride, polyorganohydrogensiloxane, alkylhydrogencyclosiloxane, and liquid copolymers comprising $SiO_2$ and bearing silicon-bonded hydrogen radicals such as are taught in U.S. Pat. No. 4,310,678, issued Jan. 12, 1982, which patent is hereby incorporated by reference to show such silicon-bonded hydrogen radical containing materials and how they are manufactured. The hydrolyzable silicon hydride should have at least one, but no more than three hydrogen atoms bonded to silicon per molecule. It should have one or two hydrolyzable atoms or radicals, such as alkoxy, bonded to silicon per molecule, such as methyldiethoxysilane. A preferred crosslinker is trimethylsilyl endblocked polymethylhydrogensiloxane. Another preferred crosslinker is methylhydrogencyclosiloxane.

The platinum compound catalyst (3), compatible with the polydiorganosiloxane, is selected from any of those well known to the art, such as those described in U.S. Pat. No. 3,923,705, issued Dec. 2, 1975, said patent being hereby incorporated by reference to show platinum catalysts. A preferred platinum compound catalyst is a composition consisting essentially of the reaction product of chloroplatinic acid and an organosilicon compound containing terminal aliphatic unsaturation, such as are described in U.S. Pat. No. 3,419,593, issued Dec. 31, 1968, said patent being incorporated by reference to describe suitable platinum compounds and their method of manufacture, where chloroplatinic acid hexahydrate is mixed with symmetrical divinyltetramethyldisiloxane to provide the complex. It is thought that homogeneous triphenylphosphine-platinum complexes such as are commonly used in organic synthesis as homogeneous catalysts will be functional in this invention. A preferred catalyst is a chloroplatinic acid complex of divinyltetramethyldisiloxane.

A catalyst inhibitor (4) is used to slow down the reaction between the hydroxyl endblocked polydiorganosiloxane free of aliphatic unsaturation and the silicon hydride crosslinker in the presence of the platinum compound catalyst during the mixing step before homogenization. The catalyst inhibitor can be any of the well known inhibitors for preventing platinum catalyzed reaction between unsaturated groups such as vinyl on silicon and hydrogen on silicon. Useful inhibitors are described in U.S. Pat. No. 3,445,420, issued May 20, 1969, which describes acetylenic inhibitors; U.S. Pat. No. 3,989,667, issued Nov. 2, 1976 which describes olefinic siloxanes; and U.S. Pat. No. 4,585,848, issued Apr. 29, 1986, which describes maleate inhibitors. Preferred inhibitors include diethylmaleate and methyl butynol.

The surfactant (5) can be an anionic surfactant, a nonionic surfactant, or a mixture of each. Surfactants useful in emulsifying silicone fluids are well known and include alkali metal sulforicinates, sulfonated glyceryl esters of fatty acids, salts of sulfonated monovalent alcohol esters, amides of amino sulfonic acid such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate and sodium lauryl ether sulfate. Preferred anionic surfactants are salt of the surface active sulfonic acids as shown in U.S. Pat. No. 3,294,725, issued Dec. 27, 1966, hereby incorporated by reference to show suitable anionic surfactants, and sulfates. A preferred surfantant is sodium lauryl sulfate.

Nonionic surfactants can be illustrated by saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine.

Sufficient water (6), preferably deionized, is added to the mixture to give a polymer content of the emulsion of from 40 to 70 percent by weight. The preferred polymer content of the emulsion is from 60 to 65 percent by weight.

The hydroxyl endblocked polydiorganosiloxane (1) is emulsion polymerized through the use of an anionic polymerization catalyst. The emulsion is emulsion polymerized by the addition of an anionic polymerization catalyst such as strong mineral acids as taught in U.S. Pat. No. 2,891,920, issued Jun. 23, 1959 or surface active sulfonic acid catalyst as taught in U.S. Pat. No. 3,294,725, issued Dec. 27, 1966, both patents being incorporated by reference to show suitable anionic polymerization catalysts, their preparation and use. The catalyst lowers the pH to 2 or less. Preferred catalysts are hydrochloric acid, sulfuric acid, and dodecylbenzene sulfonic acid.

The method of reacting the ingredients (1) through (6) is selected from the variations described below. Each of the variations combines the same ingredients, but in a different manner; so that the aqueous silicone emulsion that is produced dries to an elastomer, but the elastomer molecular configuration may depend upon the variation by which it was produced. For convenience, each variation will be referred to by number.

Method one relates to a method of producing an aqueous silicone emulsion which dries to an elastomer comprising (A) homogenizing a mixture of (1) 100 parts by weight of hydroxyl endblocked polydiorganosiloxane free of aliphatic unsaturation, (2) from 0.1 to 10 parts by weight of silicon hydride crosslinker, (3) sufficient platinum compound catalyst, compatible with the polydiorganosiloxane, to give from 1 to 200 parts by weight of platinum per million parts of polydiorganosiloxane (1), (4) catalyst inhibitor, (5) anionic or nonionic surfactant, and (6) sufficient water to yield a polydiorganosiloxane content in the mixture of from 40 to 70 percent by weight, (B) emulsion polymerizing the mixture of (A) by addition of anionic polymerization catalyst to give a polymer, then, (C) arresting polymerization by raising the pH to 6 to 7.5, whereby an aqueous silicone emulsion is obtained which gives an elastomer upon removal of the water at room temperature.

The first step of this method consists of mixing the ingredients together. The order of mixing is not critical, except that a catalyst inhibitor must be added before the catalyst. In this method, the hydroxyl endblocked polydiorganosiloxane (1), silicon hydride complex (2), and the platinum compound catalyst (3) are all present in the same emulsion micelle; therefore, a catalyst inhibitor is necessary because these three ingredients react spontaneously at room temperature. Each of the ingredients must be compatible with the mixture. After the ingredients are mixed together, the water and surfactant are added and the mixture is stirred until uniform. The uniform mixture is homogenized using any of the known homogenizers to give the stable emulsion.

The amounts of the ingredients can be determined, based upon the polydiorganosiloxane (1), which is 100 parts by weight. The silicon hydride crosslinker normally varies from about 0.1 to 10 parts by weight, depending upon what crosslinker is used, with a preferred amount of from 0.1 to 5 parts by weight. A preferred embodiment uses from 0.5 to 2 percent by weight of methylhydrogencyclosiloxane. The preferred amount of silicon hydride crosslinker should give at least one mole of hydrogen on silicon for each mole of hydroxyl radical on silicon in the polydiorganosiloxane, but this is not absolutely necessary. If there is insufficient crosslinker to react with all of the hydroxyl, the resulting elastomer may be tacky on the surface and the physical properties will not be as desirable as when the amount of crosslinker is sufficient to give complete reaction with all of the hydroxyl radicals. When more than enough crosslinker is added, the excess crosslinker can condense with itself, giving domains of very high crosslink density. At some point, these high crosslink density areas lead to poorer physical properties. The optimum amount of crosslinker can be determined by experimental means with little difficulty.

The platinum compound catalyst is present in an amount to give from 1 to 200 parts by weight of platinum as metal per one million parts by weight of the polydiorganosiloxane (1). The preferred amount is from 50 to 100 parts per million. Excess catalyst can cause color, possible shelf life problems, and excessive cost.

The catalyst inhibitor is present in an amount sufficient to give from 1.5 to 10 times the stoichiometric amount needed to react with the platinum used on a molar basis. As the amount of inhibitor is increased, the time necessary for cure can also increase. The inhibitor is present in sufficient amount to allow the ingredients to be mixed, homogenized, and polymerized. Once the homogeneous emulsion is formed, the polydiorganosiloxane polymer is polymerized and the desired high molecular weight hydroxyl endblocked polymer is formed, the inhibitor looses its effect, due to the length of time that it has been in contact with the ingredients of the emulsion. After the inhibitor looses its effect, the crosslinking reaction between the hydroxyl radicals on the polymer and the hydrogen radicals on the crosslinker proceeds, yielding a crosslinked polymer present in the emulsion particles. The time required for this all to occur depends upon the inhibitor used, the ratio of inhibitor to platinum catalyst, and the temperature of the emulsion.

The surfactant is used in an amount sufficient to give a stable emulsion. Generally less than 2 parts by weight can be used. If too much surfactant is used, it can affect the physical properties of the resulting elastomer.

Sufficient water is used to give from 10 to 80 percent by weight solids in the final emulsion. The amount of water should give a polydiorganosiloxane content in the mixture before polymerization of from 40 to 70 percent by weight, the emulsion preferably has a polymer content of between 40 and 65 percent by weight, with from 60 to 65 percent most preferred. The solids content of the final emulsion is that portion of the total emulsion which is not volatile. It includes the polymer, crosslinker, surfactant, and filler, if any is present.

After the emulsion of step (A) is prepared, the polydiorganosiloxane in the emulsion is emulsion polymerized by the addition of an anionic polymerization catalyst such as strong mineral acids as taught in U.S. Pat. No. 2,891,920, issued Jun. 23, 1959 or surface active sulfonic acid catalyst as taught in U.S. Pat. No. 3,294,725, issued Dec. 27, 1966. The catalyst lowers the pH to 2 or less. Preferred catalysts are hydrochloric acid, sulfuric acid, and dodecylbenzene sulfonic acid. The polymerization will proceed satisfactorily at room temperature. The preferred temperature is from 25° to 90° C. The time is not critical but will vary depending upon the speed of the reaction and the viscosity of the polymer that is desired. A preferred condition is 20 hours at room temperature.

Once the polymerization has proceeded to the desired degree, the polymerization is stopped by raising the pH to from 6 to 7.5. The pH is raised by adding a neutralizing material such as an alkaline material such as alkali metal hydroxide or organic amine, preferably in the form of an aqueous solution, such as 20 percent by weight alkaline material in water. Adding the alkaline material as an aqueous solution helps eliminate the possibility of the emulsion being broken by the addition of a concentrated material. Preferred neutralizing materials are solutions of sodium hydroxide and solutions of diethylamine.

The aqueous silicone emulsion produced by the method of this invention dries to an elastomer upon the removal of the water, which can be done at room temperature by merely exposing the emulsion to the atmosphere and allowing the water to evaporate. The temperature can be raised to hasten the drying if desired. The elastomer produced by this process can be filled with any of the well known reinforcing or non-reinforcing fillers useful with silicon elastomers as long as the filler is chosen so that it does not effect the pH of the emulsion so that it goes out of the required range of from 6 to 7.5. Common reinforcing fillers include fumed silica, colloidal silica dispersions, fumed titanium dioxide, and colloidal titanium dioxide dispersions. Non-reinforcing fillers include ground quartz, calcium carbonate, non-acidic carbon black, clays, aluminum oxide, zinc oxide, mica, and various coloring pigments. These fillers should be finely divided and it may be advantageous to add them as aqueous dispersions. The amount of filler added is not critical, it is chosen to give the desired effect, such as increased tensile strength, or increased hardness or increased modulus for the resulting elastomer. A preferred reinforcing filler is an aqueous, dispersed, fumed silica. A preferred non-reinforcing filler is calcium carbonate.

The emulsion produced by this method is useful as a coating and as a sealant. The characteristics of the emulsion can be varied to give the desired characteristics, such as a very flowable, liquid material, or a thick, non-slumping paste, by varying the ingredients. The viscosity of the polydiorganosiloxane produced in the emulsion, the solids content of the emulsion, and the fillers used can all be varied to give the desired properties for the emulsion and the elastomer produced from the emulsion.

The above method one can be varied to give a method two. Method two relates to a method of producing an aqueous silicone emulsion which dries to an elastomer comprising (A) homogenizing a mixture of (1) 100 parts by weight of hydroxyl endblocked polydiorganosiloxane free of aliphatic unsaturation, (2) from 0.1 to 10 parts by weight of silicon hydride crosslinker, (5) anionic or nonionic surfactant, and (6) sufficient water to yield a polydiorganosiloxane content in the mixture of from 40 to 70 percent by weight, then (B) emulsion polymerizing the mixture of (A) by addition of anionic polymerization catalyst to yield a polymer, then (C) arresting polymerization by raising the pH to 6 to 7.5, to obtain emulsion A, then (D) homogenizing a mixture of (1) from 0 to 100 parts by weight of hydroxyl endblocked polydiorganosiloxane free of aliphatic unsaturation, and (3) platinum compound catalyst, compatible with the polydiorganosiloxane, (5) anionic or nonionic surfactant, and (6) water, then, when (1) is greater than 0, (E) emulsion polymerizing the mixture of (D) by addition of anionic polymerization catalyst, then (F) arresting polymerization by raising the pH to 6 to 7.5, to obtain emulsion B, then (G) mixing emulsion A and sufficient emulsion B to obtain from 1 to 200 parts by weight of platinum per million parts of polydiorganosiloxane (1), whereby an aqueous silicone emulsion is obtained which gives an elastomer upon removal of the water at room temperature.

Method two is varied from method one in that the platinum compound catalyst (3) is removed from emulsion A and made into an emulsion B along with part of the polydiorganosiloxane (1). Since the catalyst is present in a different micelle in the emulsion than that containing the silicon hydride crosslinker, there is no need for the catalyst inhibitor (4) in the mixture when this version of the method is used. Method one gives an emulsion having a crosslinked particle in the emulsion since all of the required ingredients are in the same particle or micelle. Method two does not give a crosslinked particle until the emulsion is dried. During the drying process, the particles or micelles of emulsion A containing the hydroxyl endblocked polydiorganosiloxane and silicon hydride crosslinker are forced into contact with the micelles of emulsion B containing the rest of the polydiorganosiloxane and the platinum compound catalyst so that the reaction between the polydiorganosiloxane and the crosslinker is catalyzed and the crosslinking takes place. Both emulsions contain polymer so that there is no or little migration between micelles in the emulsion. During drying, the different micelles are forced together and readily coalesce because they are very compatible. Mixing the platinum catalyst with the hydroxyl endblocked polydiorganosiloxane before polymerization and emulsifying results in a very good dispersion of the catalyst in the emulsion. When a method is attempted in which the catalyst is added to emulsion A without emulsifying, the result is a film which cures to an elastomer, but one in which there are brown spots, due to the poor dispersion of the catalyst. Emulsion B can be made with varying amounts, including 0, of the polydiorganosiloxane present with the catalyst. It is preferred that a part of the polydiorganosiloxane be present in emulsion B because it results in a more stable emulsion and a better compatibility of the particles of the two emulsions during drying. When the amount of (1) is 0, there is no need, of course, for the emulsion polymerizing step (E) and the arresting polymerization step (F). The emulsion of the catalyst does, however, allow a good dispersion of the two emulsions so that there are no high concentrations of catalyst present in the final emulsion, as there are when just the catalyst is added to emulsion A.

A third version of the method of this invention combines the polydiorganosiloxane and catalyst in emulsion A and the crosslinker in emulsion B. Method three relates to a method of producing an aqueous silicone emulsion which dries to an elastomer comprising (A) homogenizing a mixture of (1) 100 parts by weight of hydroxyl endblocked polydiorganosiloxane free of aliphatic unsaturation, and (3) sufficient platinum compound catalyst, compatible with the polydiorganosiloxane, to give from 1 to 200 parts by weight of platinum per million parts of polydiorganosiloxane (1), (5) anionic or nonionic surfactant, and (6) sufficient water to give a polydiorganosiloxane content in the mixture of from 40 to 70 percent by weight, then (B) emulsion polymerizing the mixture of (A) by addition of anionic polymerization catalyst, then (C) arresting polymerization by raising the pH to 6 to 7.5, to obtain emulsion A, then (D) homogenizing a mixture of (2) silicon hydride crosslinker, (5) anionic or nonionic surfactant, and (6) water, to obtain emulsion B, then (E) mixing emulsion A and emulsion B in sufficient quantity to obtain from 0.1 to 10 parts by weight of silicon hydride crosslinker in Emulsion B per 100 parts by weight of hydroxyl endblocked polydiorganosiloxane in emulsion A, whereby an aqueous silicone emulsion is obtained which gives an elastomer upon removal of the water at room temperature.

Because emulsion B contains only the silicon hydride crosslinker and the crosslinker is not copolymerized with the polydiorganosiloxane, the crosslinker is free to migrate out of the emulsion micelle. For this reason, the shelf life of the emulsion in which emulsion A and emulsion B are combined is not as long as for the other versions. In method three, it is preferred that the emulsion A and emulsion B be stored separately, then combining them shortly before use. Upon drying, the micelles of emulsion A and of emulsion B are forced together, the ingredients react, and an elastomeric product is the result.

The following examples are included for illustrative purposes only and should not be construed as limiting the invention which is properly set forth in the appended claims.

EXAMPLE 1

First, 709.2 g of hydroxyl endblocked polydimethylsiloxane having a viscosity of about 0.08 Pa.s, 3.56 g of trimethylsiloxy endblocked polymethylhydrogensiloxane having a viscosity of about 0.13 Pa.s at 25° C. and a silicon-bonded hydrogen atom content of about 1.6 percent by weight, and 3.56 g of diethylmaleate were stirred for several minutes until a solution resulted. Then 10.7 g of a chloroplatinic acid complex of divinyltetramethyldisiloxane diluted with dimethylvinylsiloxy endblocked polydimethylsiloxane to provide 0.7 weight percent platinum was added to this solution and it was stirred for several minutes to effect dissolution. Next 25 g of a 30 percent aqueous solution of sodium lauryl sulfate and 341 g of distilled and deionized water were added and the mixture was stirred for 30 minutes. The mixture was homogenized using a single stage laboratory homogenizer at 7,500 psi to produce an oil in water emulsion having an average particle size of about 0.35 micrometers. The emulsion was polymerized by adding 8 g of 4N hydrochloric acid to the emulsion and shaking it for several minutes in a closed container. The emulsion was allowed to stand at room temperature for 20 hrs. without agitation to complete the polymerization process. Emulsion polymerization was terminated by adding enough 2 percent aqueous sodium hydroxide solution to raise the pH of the emulsion to 6 to 7.5. This emulsion polymer consisted of a polydimethylsiloxane/0.5 weight percent polymethylhydrogen copolymer having a weight average molecular weight of about 220,000 and containing 0.5 wt percent diethylmaleate (a catalyst inhibitor) and 100 ppm platinum. The emulsion was approximately 62 percent solids by weight.

A film was cast from this emulsion by pouring 8.0 g of emulsion into a 100 mm diameter plastic Petri dish and allowing it to dry under ambient conditions for 4 days. The resulting film was elastomeric.

A reinforced elastomeric film was prepared by mixing 15 g of this emulsion with 7.2 g of aqueous, dispersed, fumed silica (Cabosperse), having a percent solids of 15.5 by weight, a pH of 7.7 and a surface area of 200 m2/g. This mixture was shaken in a closed container for several minutes, centrifuged to exclude air bubbles and poured into a Petri dish. After drying for 7 days at ambient conditins, mechanical properties of the elastomeric film were determined. The elastomer had 112 psi ultimate tensile strength and 350 percent ultimate elongation.

EXAMPLE 2

To 645.6 g of the hydroxyl endblocked polydimethylsiloxane of Example 1 was added 3.24 g of the trimethylsiloxy endblocked polymethylhydrogensiloxane of Example 1 and the mixture was stirred several minutes until dissolution occurred. Then 25 g of a 30 percent aqueous solution of sodium lauryl sulfate and 309.8 g of distilled and deionized water were added and the mixture was stirred for 30 minutes. Next the mixture was homogenized using a laboratory single stage homogenizer at 7500 psi to produce an emulsion having an average particle size of 0.33 micrometer and a solids content of about 62 to 65 percent by weight. The emulsion was polymerized by adding 6 g of 4N hydrochloric acid and shaking the emulsion several minutes in a closed container. The emulsion was allowed to stand at room temperature for 20 hrs after which polymerization was terminated by adding enough 2 percent aqueous sodium hydroxide solution to raise the pH to 6 to 7.5. This emulsion (emulsion A) consisted of a polydimethylsiloxane/5 weight percent polymethylhydrogensiloxane copolymer and was reserved for use with a second emulsion described below.

To 648.9 g of the hydroxyl endblocked polydimethylsiloxane fluid used above was added 9.98 g of the platinum catalyst used in Example 1 and the mixture was stirred for several minutes to effect dissolution. Then 25 g of a 30 percent aqueous solution of sodium lauryl sulfate and 309.8 g of distilled and deionized water were added and the mixture was stirred for 30 minutes. The mixture was homogenized using a single stage laboratory homogenizer at 7500 psi to produce an emulsion having an average particle size of about 0.33 micrometer. The emulsion was polymerized by adding 6 g of 4N hydrochloric acid and shaking it for several minutes. The emulsion was allowed to stand for 21 hrs at room temperature, after which polymerization was terminated by adding enough 2 percent aqueous sodium hydroxide solution to raise the pH of the emulsion to 6.5 to 7.5. This emulsion (emulsion B) consisted of an approximately 62 percent by weight solids polydimethylsiloxane emulsion polymer having a weight average molecular weight of about 250,000 and also containing 100 ppm Platinum.

Then 100 g of the above described emulsion B (containing the Pt catalyst) was mixed with an equal weight of the previously described emulsion A (polydimethylsiloxane/polymethylhydrogensiloxane copolymer) and stirred for several minutes. The resulting mixture consisted of an approximately 62 percent solids emulsion of polydimethylsiloxane—0.25 wt percent polymethylhydrogen siloxane that contained 50 ppm platinum based on polymer weight. Films were cast from this emulsion and air dried for 24 hours; they were elastomeric. A portion of this emulsion was mixed with enough aqueous, dispersed, fumed silica (Cabosperse F) to provide an emulsion containing 10 pph silica by weight of polymer. Cabosperse F is 12 percent by weight solids, has a pH of from 7.5 to 7.8, a viscosity of less than 100 cps., and a nominal particle size of 7 nanometers. A film was cast from this emulsion and it was allowed to dry under ambient conditions. Two weeks later mechanical properties of the film were determined. The elastomeric film had 130 psi ultimate tensile strength and 400 percent ultimate elongation.

EXAMPLE 3

First, an emulsion A was prepared by weighing 648.9 g of the hydroxyl endblocked polydimethylsiloxane of Example 1 and 10.7 g of the chloroplatinic acid complex of divinyltetramethyldisiloxane diluted with dimethylvinylsiloxy endblocked polydimethylsiloxane of Example 1 into a beaker and stirring the mixture for several minutes to effect dissolution. Next 26.5 g of a 30% aqueous solution of sodium lauryl sulfate and 309.8 g of deionized water were added and the mixture was stirred for 30 minutes. The mixture was homogenized using a single stage laboratory homogenizer at 7,500 to produce an oil in water emulsion having an average particle size of about 0.35 micrometers. The emulsion was polymerized by adding 8 g of 4N hydrochloric acid to the emulsion and shaking it for several minutes in a closed container. The emulsion was allowed to stand at room temperature for 20 hrs. without agitation to complete the polymerization process. Emulsion polymerization was terminated by adding enough 2% aqueous sodium hydroxide solution to raise the pH of the emulsion to 6.5-7.0. Emulsion A consisted of an approximately 62 percent by weight solids emulsion of hydroxyl endblocked polydimethylsiloxane (weight average molecular weight about 220,000) and it contained 100 parts by weight platinum per one million parts by weight polydimethylsiloxane. The emulsion was reserved for later use.

Next, emulsion B was prepared by stirring together 648.9 g of the trimethylsiloxy endblocked polymethylhydrogensiloxane of Example 1, 26.5 g of a 30 percent by weight aqueous sodium lauryl sulfate solution, and 309.8 g of deionized water for 30 minutes followed by homogenizing using a laboratory homogenizer. Two passes were made through the homogenizer to produce an emulsion having an average particle size of about 0.3 micrometers. Emulsion B consisted of an approximately 64% solids by weight aqueous emulsion of polymethylhydrogensiloxane.

Five aliquots of emulsion A were weighed into vials followed by enough emulsion B to provide samples having 0.5, 1.0, 1.5, 2.0 and 5.0 percent polymethylhydrogensiloxane fluid by weight of polydimethylsiloxane emulsion polymer. The vials were capped and shaken for 30 minutes followed by lightly centrifuging them to exclude air bubbles from the emulsion. Next films were cast from these emulsions by pouring 10 g of emulsion into Petri dishes and allowing them air dry for 24 hours. All of the resulting films were elastomeric. However, the film prepared from the emulsion that contained 5.0 weight percent polymethylhydrogensiloxane fluid was of very poor quality; it had very low tensile strength and very low elongation. The sample containing 1.5 percent polymethylhydrogensiloxane fluid gave the film having the best properties.

EXAMPLE 4

This comparative example shows the effect of following the process of method two, but not emulsifying the platinum catalyst.

To 645.6 g of the hydroxyl endblocked polydimethylsiloxane of Example 1 was added 3.24 g of the polymethylhydrogensiloxane fluid of Example 1 and the mixture was stirred several minutes until dissolution occurred. Then, 25 g of a 30 percent by weight aqueous solution of sodium lauryl sulfate and 309.8 g of deionized water were added and the mixture was stirred for 30 minutes. Next the mixture was homogenized using a laboratory single stage homogenizer at 7500 psi to produce an emulsion having an average particle size of 0.33 micrometers and a solids content of about 62-65 percent by weight. The emulsion was polymerized by adding 6 g of 4N hydrochloric acid and shaking the emulsion several minutes in a closed container. The emulsion was allowed to stand at room temperature for 20 hrs, after which polymerization was terminated by adding enough 2% aqueous sodium hydroxide solution to raise pH to 6.5-7.5. This emulsion consisted of a polydimethylsiloxane/5 percent by weight polymethylhydrogensiloxane copolymer.

To 20 g of the above emulsion contained in a vial was added 0.19 g of the platinum catalyst of Example 1, and the vial was capped and shaken for 24 hours. Next the vial was lightly centrifuged to exclude air bubbles from the emulsion, the emulsion was poured into a Petri dish and it was allowed to air dry for four days. The resulting film was elastomeric, but contained dark spots believed to be caused by poor dispersion of the platinum compound catalyst.

EXAMPLE 5

An emulsion was prepared following method two in which the amount of polydimethylsiloxane in emulsion B was 0.

First an emulsion A was prepared by mixing 645.6 g of the hydroxyl endblocked polydimethylsiloxane fluid of example 1 and 3.24 g of the polymethylhydrogen siloxane fluid of example 1 and stirring several minutes until dissolution occurred. Then 25 g of a 30 percent aqueous solution of sodium lauryl sulfate and 309.8 g of deionized water were added and the mixture was stirred for 30 minutes. Next the mixture was homogenized using a laboratory single stage homogenizer at 7500 psi to produce an emulsion having an average particle size of 0.33 micrometers and a solids content of about 62-65 percent by weight. The emulsion was polymerized by adding 6 g of 4N hydrochloric acid and shaking the emulsion several minutes in a closed container. The emulsion was allowed to stand at room temperature for 20 hrs after which polymerization was terminated by adding enough 2 percent aqueous sodium hydroxide solution to raise pH to 6.5-7.5. This emulsion consisted of a polydimethylsiloxane/5 weight percent polymethylhydrogensiloxane copolymer.

Then emulsion B was prepared by mixing 300 g of the chloroplatinic acid complex of example 1, 15 g of a 30 percent aqueous solution of sodium lauryl sulfate and 285 g of deionized water for 30 minutes followed by homogenizing using a single stage laboratory homogenizer. Three passes at 7500 psi were required to produce an emulsion of uniform particle size. Emulsion B consisted of a 50 percent by weight solids emulsion of platinum catalyst. The platinum concentration in emulsion B was approximately 0.33 percent by weight.

Then 20 g of emulsion A was weighed into a vial followed by 0.38 g of emulsion B. The vial was capped, shaken for 30 minutes and lightly centrifuged to exclude air bubbles. The emulsion was poured into a Petri dish and allowed to air dry at ambient conditions for 24 hrs. The resulting film was elastomeric. There were no dark spots in this sample, indicating that the platinum was well dispersed when compared to the result of comparative example 4.

EXAMPLE 6

A comparative example was prepared using the same ingredients as in Example 1, but in which each ingredient, (1), (2), and (3) were in separate emulsions.

An Emulsion A was prepared by mixing 648.9 g of the hydroxyl endblocked polydimethylsiloxane fluid of Example 1, 26.5 g of a 30 percent aqueous solution of sodium lauryl sulfate and 309.8 g of deionized water into a beaker and stirring the mixture for 30 minutes. The mixture was then homogenized using a single stage laboratory homogenizer at 7,500 psi to produce an oil in water emulsion having an average particle size of about 0.35 micrometer. The emulsion was polymerized by adding 8 g of 4N hydrochloric acid to the emulsion and shaking it for several minutes in a closed container. The emulsion was allowed to stand at room temperature for 20 hrs. without agitation to complete the polymerization process. Emulsion polymerization was terminated by adding enough 2 percent aqueous sodium hydroxide solution to raise the pH of the emulsion to 6.5-7.0.

Emulsion A consisted of an approximately 62% by weight solids emulsion of hydroxyl endblocked polydimethylsiloxane (weight average molecular weight about 220,000).

An Emulsion B was prepared by mixing 648.9 g of the polymethylhydrogensiloxane of Example 1, 26.5 g of a 30 percent by weight aqueous sodium lauryl sulfate solution and 309.8 g of deionized water were stirred for 30 minutes followed by homogenizing using a laboratory homogenizer. Two passes were made through the homogenizer to produce an emulsion having an average particle size of about 0.3 micrometer. Emulsion B consisted of an approximately 64 percent solids by weight aqueous emulsion of polymethylhydrogensiloxane.

Then an Emulsion C was prepared by mixing 300 g of the chloroplatinic acid complex of Example 1, 15 g of a 30 per cent aqueous solution of sodium lauryl sulfate and 285 g of deionized water for 30 minutes followed by homogenizing using a single stage laboratory homogenizer. Three passes at 7500 psi were required to produce an emulsion of uniform particle size. Emulsion C consisted of a 50 per cent by weight solids emulsion of the platinum complex catalyst. Platinum concentration in emulsion C was approximately 0.33 per cent by weight.

Three 20 g aliquots of emulsion A were weighed into vials followed by enough emulsion B to provide samples having 0.5, 2.0 and 5.0 per cent polymethylhydrogensiloxane fluid by weight of polydimethylsiloxane emulsion polymer. Next 0.38 g of emulsion C was added to each vial, and they were capped and shaken for 30 minutes followed by lightly centrifuging them to exclude air bubbles from the emulsions. Next films were cast from these emulsions by pouring 10 g of emulsion into Petri dishes and allowing them to air dry for 24 hours. None of the resulting films cured to form an elastomer. Instead, each film consisted of tacky gum. Another 20 g aliquot of emulsion A was mixed with enough emulsion B to make a sample having 10 per cent polymethylhydrogensiloxane fluid by weight of polydimethylsiloxane. Then 0.38 g of emulsion C was added, the emulsion was shaken for 30 minutes, centrifuged and poured into a Petri dish. After 24 hours, the resulting composition had cured, but it was not elastomeric. Although it was not tacky, it was extremely weak and friable, but not elastomeric.

EXAMPLE 7

An Emulsion A was produced by mixing 648.9 g of the hydroxyl endblocked polydimethylsiloxane fluid of Example 1, and 10.7 g of the chloroplatinic acid complex of Example 1 for several minutes to effect dissolution. Next 26.5 g of a 30% aqueous solution of sodium lauryl sulfate and 309.8 g of deionized water were added and the mixture was stirred for 30 minutes. The mixture was homogenized using a single stage laboratory homogenizer at 7,500 to produce an oil in water emulsion having an average particle size of about 0.35 micrometers. The emulsion was polymerized by adding 8 g of 4N hydrochloric acid to the emulsion and shaking it for several minutes in a closed container. The emulsion was allowed to stand at room temperature for 20 hrs. without agitation to complete the polymerization process. Emulsion polymerization was terminated by adding enough 2 percent aqueous sodium hydroxide solution to raise pH of the emulsion to 6.5–7.0. Emulsion A consisted of an approximately 62% by weight solids emulsion of hydroxyl endblocked polydimethylsiloxane (weight average molecular weight about 220,000) and it contained 100 parts per million by weight of platinum. The emulsion was reserved for later use.

An emulsion was prepared by mixing 50 parts by weight of the reaction product obtained from reacting an acidic mixture of 50 parts by weight of solid, benzene soluble resin copolymer consisting essentially of Me3SiO1/2 units and SiO4/2 units at a ratio of about 0.75 to 1.0 as a solvent solution, and 50 parts by weight of trimethylsiloxy endblocked polymethylhydrogensiloxane having a viscosity of about 0.13 Pa.s at 25° C. and a silicon-bonded hydrogen atom content of about 1.6 percent by weight, and removing the solvent, the reaction product being about 97 percent non-volatile content with a viscosity at 25° C. of about 1.3 Pa.s, a hydroxy content of about 1.6 percent by weight, and a hydrogen content of about 0.8 percent by weight with 29.5 parts of an aqueous phase consisting of 27 parts of water, 0.5 parts of sodium alkylarylpolyether sulfonate (Triton X-200, Rhom and Haas Co., Inc. Philadelphia, Pa.), 1.33 parts of polyvinylalcohol (PVA) having approximately 12 percent unhydrolyzed vinyl acetate groups and a viscosity, at 4 percent solids in water, of 22 mPa.s and 0.67 parts of PVA having approximately 12 percent unhydrolyzed vinyl acetate groups and a viscosity, at 4 percent solids in water, of 5 mPa.s; passing the mixture through a colloid mill and stirring the resulting emulsion into 20.5 parts of water. The final emulsion had a calculated solids content of 52 percent and a calculated liquid silicone resin/PVA ratio of 25, based upon the amounts used. This was emulsion B.

Four 20 g aliquots of emulsion A were weighed into vials followed by enough emulsion B to provide samples having 1.0, 2.0, 3.0 and 5.0 per cent by weight of the reaction product in emulsion B. The vials were shaken for 30 minutes and centrifuged lightly to remove air bubbles from the emulsions. Films were cast by pouring approximately 10 g of each emulsion into a Petri dish and allowing it to dry under ambient conditions for 24 hours. Each of the resulting films was elastomeric.

EXAMPLE 8

A comparative example was prepared using the same ingredients as in example 7 with the ingredients in separate emulsions.

An emulsion A was prepared as in example 6, giving an emulsion of hydroxyl endblocked polydimethylsiloxane fluid.

An emulsion B was prepared as in example 7, giving an emulsion of silicon hydride crosslinker.

An emulsion C was prepared as in example 6, giving an emulsion of platinum compound catalyst.

Three 20 g aliquots of emulsion A were weighed into vials followed by enough emulsion B to provide samples having 1.0, 2.0 and 5.0 per cent of the reaction product in emulsion B based on the weight of polydimethylsiloxane. Next 0.38 g of emulsion C was added to each vial, and the vials were shaken for 30 minutes followed by lightly centrifuging them to exclude air bubbles from the emulsions. Next films were cast by pouring 10 g of emulsion into Petri dishes and allowing them to air dry for 24 hours. None of the resulting films-cured to form an elastomer. As in example 6, each film was a tacky, sticky gum.

That which is claimed is:

1. A method of producing an aqueous silicone emulsion which dries to an elastomer comprising
   (A) homogenizing a mixture of
   (1) 100 parts by weight of hydroxyl endblocked polydiorganosiloxane free of aliphatic unsaturation,
   (2) from 0.1 to 10 parts by weight of silicon hydride crosslinker,
   (5) anionic or nonionic surfactant, and
   (6) sufficient water to yield a polydiorganosiloxane content in the mixture of from 40 to 70 percent by weight, then
   (B) emulsion polymerizing the mixture of (A) by addition of anionic polymerization catalyst to yield a polymer, then
   (C) arresting polymerization by raising the pH to 6 to 7.5, to obtain emulsion A, then
   (D) homogenizing a mixture of
   (1) from 0 to 100 parts by weight of hydroxyl endblocked polydiorganosiloxane free of aliphatic unsaturation, and
   (3) platinum compound catalyst, compatible with the polydiorganosiloxane,
   (5) anionic or nonionic surfactant, and
   (6) water, then, when (1) is greater than 0,
   (E) emulsion polymerizing the mixture of (D) by addition of anionic polymerization catalyst, then
   (F) arresting polymerization by raising the pH to 6 to 7.5, to obtain emulsion B, then
   (G) mixing emulsion A and sufficient emulsion B to obtain from 1 to 200 parts by weight of platinum per million parts of polydiorganosiloxane (1), whereby an aqueous silicone emulsion is obtained which gives an elastomer upon removal of the water at room temperature.

2. The method of claim 1 in which (1) has a viscosity of less than 250 centipoise at 25° C.

3. The method of claim 2 in which (2) is from 0.5 to 2 parts by weight of the weight of (1) and is a trimethylsilyl endblocked polymethylhydrogensiloxane.

4. The method of claim 3 in which (3) is the reaction product of chloroplatinic acid and an organosilicon compound containing terminal aliphatic unsaturation.

5. The method of claim 4 which adds step (H) admixing filler.

6. The aqueous silicone emulsion produced by the method of claim 1.

7. The aqueous silicone emulsion produced by the method of claim 5.

* * * * *